Dec. 2, 1947.                E. LAESSER                2,432,020
                          GEAR PLANING MACHINE
               Filed May 26, 1944            2 Sheets-Sheet 1

Inventor:
Emil Laesser
by Sommers-Young
Attorneys

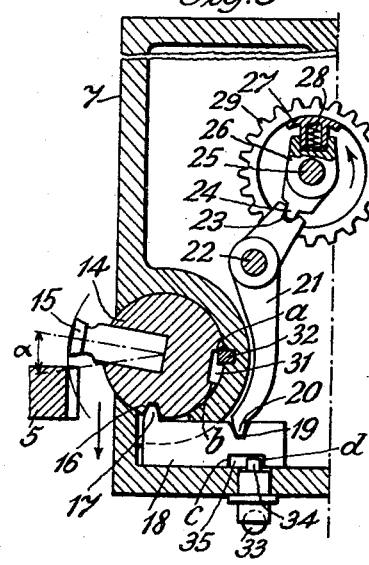
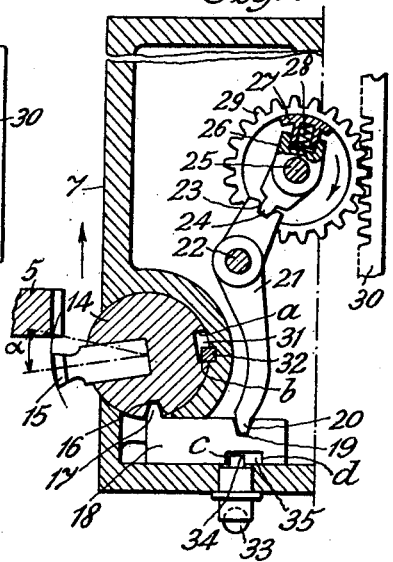
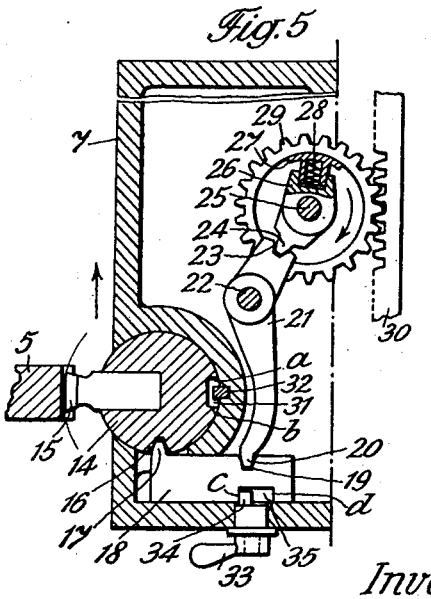

Patented Dec. 2, 1947

2,432,020

UNITED STATES PATENT OFFICE 2,432,020

GEAR PLANING MACHINE

Emil Laesser, Zurich, Switzerland, assignor to Maag-Zahnräder und -Maschinen Aktiengesellschaft, Zurich, Switzerland Application May 26, 1944, Serial No. 537,491
In Germany April 29, 1943

3 Claims. (Cl. 90—8)

The present invention relates to gear planing machines operating on the principle of relative rolling motion of parts connected with a rack like tool.

Several constructions of machines of this kind are already known. In all of these the tool is held by a pivotal holder which is mounted on a rectilinearly movable ram. The detaching of cuttings takes place in machines of this kind without exception while the ram moves in one or the other direction. The ineffective return stroke of the ram is usually effected at increased speed and the holder carrying the rack like tool is pivotally displaced somewhat rearwardly in order to let the tool freely pass by the work. Therefore, the time required by the ram to perform its return stroke must be considered as lost in the operation of the machine.

The present invention has for its object a gear planing machine in which in the tool carrier ram a tool holder is rotatably mounted which is controlled by the movements of the tool carrier ram, in such manner, that the tool performs a pivotal movement in the course of each stroke of the tool carrier ram in order to permit of the detaching of cuttings to take place in either direction of movement of the ram.

For the purpose of effecting the detaching of cuttings in both directions of movement, a tool which cuts in both directions of movement of the ram is clamped to the tool carrier ram and which is pivotally displaced at the beginning of each ram stroke until the tool holder hits a stop for the tool carrier ram. Consequently, as a loss of time only the period is yet to be considered in which the tool moves beyond the work. Further, it is possible to carry on the planing work only in one or the other direction of movement of the ram, as desired, by merely changing over a stop means. This may at times be necessary, for example, in planing stepped gears not having sufficient spare room for a tool with two opposed cutting edges to pass out of engagement with the work. With conventional gear planing machines, operating by means of chasing tools, in general, working is possible only in one direction of movement of the ram.

A form of a machine according to the present invention is illustrated by way of example only in the accompanying drawings in which Fig. 1 shows a schematic elevation partly in section of this machine;

Fig. 3 is a sectional view of the tool carrier ram disclosing the pivotal tool holder in position for planing in the downward direction;

Fig. 3a is a view indicating the corresponding position of the stop lever;

Fig. 4 is a view similar to Fig. 3 showing the ram in position for planing upwardly.

Fig. 5 is a view similar to Fig. 3 showing the tool holder and the stop lever in their positions for planing in one direction of movement of the ram only, the ram being shown while performing the return stroke;

Fig. 6a is a view indicating the position of the stop lever in position for planing in the downward direction of movement of the ram, and Fig. 6b is a view similar to Fig. 6a but concerning the planing upwards.

Figure 1:
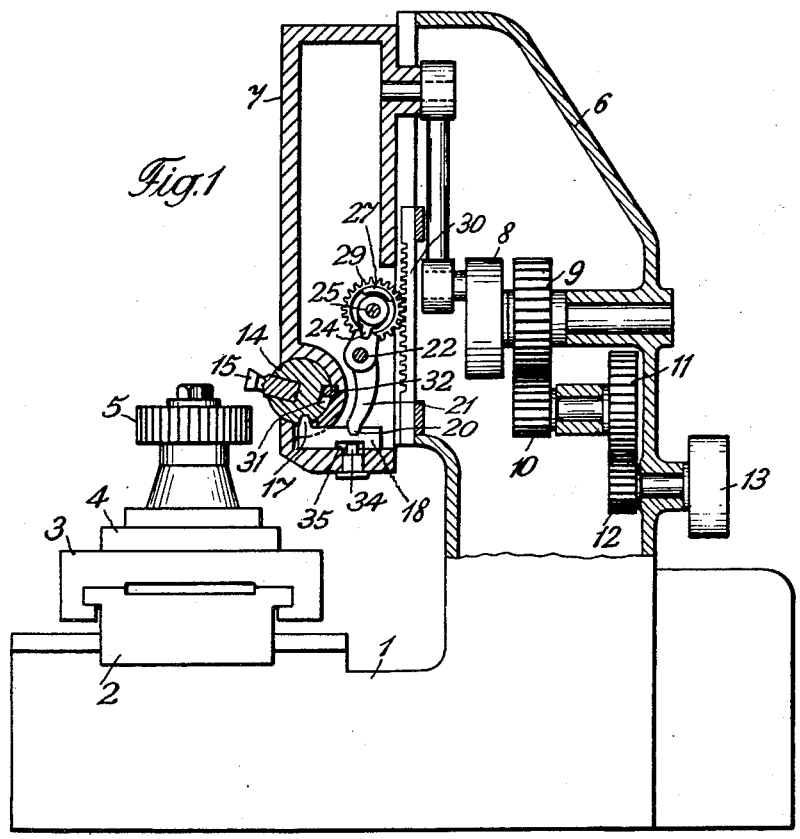
Figure 2:
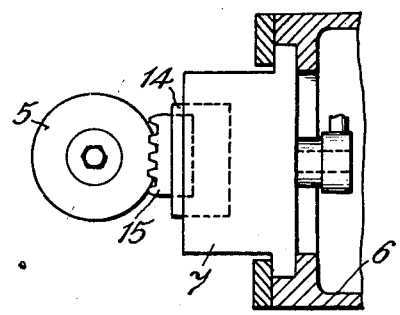
Fig. 2 is a top plan view of a tool carrier ram.

Referring to Fig. 1, on the bed 1 of the machine a ram or slide 2 is mounted which is movable in the direction toward the tool for applying the work to the latter and vice versa. A further slide 3 mounted on the slide 2 is provided with a round work table 4 and is arranged for peforming the relative rolling motion, as required for the planing, together with said table. The table 4 carries the work 5 in clamping engagement therewith. On a standard 6 of the machine bed the tool carrier ram 7 reciprocates up and down by control of a crank 8. This crank has driving movement imparted thereto via gear wheel drives 9, 10 and 11, 12 by a coupling 13 which is operatively connected with a motor (not shown).

In the tool carrier ram 7 (Figs. 2 to 5) is rotatably mounted a holder 14 for a rack like tool 15. In Fig. 3 the machine is shown in the condition for planing in the downward direction of ram movement, whereas Fig. 4 shows the condition for planing upwards. For obtaining these conditions the holder 14 is pivotally displaced in time with each stroke through an angle α. To this end the tool holder is provided with a tooth gap or socket 16 into which projects a tooth or nose 17 on a latch 18 which also is provided with a tooth gap, at 19. With the latter gap interengages a tooth 20 on a lever 21. The other arm of this lever which is fulcrumed on an axis 22 is provided with a similar tooth gap 23 with which cooperates a tooth 24 on a friction coupling. This coupling is constituted by a cam 26 which is arranged for swinging about an axis 25 and is provided with a loose sliding shoe 27 which is urged outwardly by a spring 28 and cooperates with the inner wall of a sleeve 29 which is rotatably mounted in the ram 7. The sleeve 29 carries an outer tooth system which meshes with a rack 30 which is secured to the standard 6.

In Fig. 3 the machine is shown to start out on a planing stroke in the downward direction. The sleeve 29 has rotational movement imparted thereto by mutual rolling movement between its tooth system and the rack 30 in the counterclockwise direction. Due to friction action between the sliding shoe 27 and the sleeve the cam 26 is first turned along, thereby pushing the latch 18 toward the left by means of the lever 21. The latch thus rotates the holder 14 until the side wall a of a recess 31 meets with a stop member 32 which is tenoned in the ram 7 so that the cam 26 comes to a standstill.

With the holder 14 in this position the tool 15 has arrived in its effective planing position so that the detaching of cuttings can begin. The consequent pressure effect on the cutting edge of the tool is transmitted via the wall a to the stop member 32 which thus prevents the tool from further pivoting toward above. On the termination of the working stroke when the tool has completely moved out of the embrace of the tooth gap the direction of movement of the ram is changed over toward above (Fig. 4.)

The sleeve 29 then rotates in the clockwise direction so that the latch 18 moves toward the right. By this means the holder 14 is pivotally displaced through an angu'ar range α until the stop member 32 meets with the wall b. During the planing operation in both directions of ram movement the stop lever 33 remains in median position (Fig. 3a) so that neither of two side walls c, d of a recess 35 in the latch 18 comes in contact with a stud 34.

A further functioning of the machine consists in that planing can be effected in either of two directions of ram movement as desired, at will. For this purpose the stop lever 33 need merely be changed over in corresponding manner (Figs. 5 and 6). Figs. 5 and 6a show the condition for planing in the downward direction of ram movement while the stud 34 is situated in its extreme left hand position.

If the ram then moves ineffectively in the upward direction (Fig. 5) the latch 18 is shifted toward the right until the wall face c of the recess 35 meets with the stud 34 the position of which is so chosen that with the latch in corresponding position the tool 15 is situated exactly in median position. The cutting edges are then pivotally retracted from cutting position a sufficient amount for being adapted to move past the tooth flanks of the work.

The next following working stroke in the downward direction rotates the sleeve 29 before the tool has arrived at the gear so that the holder 14 is moved into position of operation, as shown in Fig. 3, in which the stud 34 projects into the recess 35 without touching either of the two wall faces c, d.

If, however, it is desired to effect planing work in the upward direction of ram movement the stop lever 33 must be changed over as shown in Fig. 6b. In this case the face d bears on the stud 34 during the downward movement of the ram so that the latch 18 and the tool 15 are compelled to assume their positions as shown in Fig. 5 again. In this instance by the working stroke in the upward direction the position of the tool as shown in Fig. 4 is first brought about, on which follows the detaching of cuttings and then the changing over of the tool holder for return movement. For the planing in one direction of ram movement only, a tool with two opposed cutting edges as well as a conventional tool with only one cutting edge can be used.

Obviously a tool with two opposed cutting edges may be formed by two tools having a single cutting edge only.

I claim:

1. In a gear planing machine a reciprocatory tool carrier ram, a tool adapted to cut in either direction of movement of the ram, a tool holder mounted in said ram to rotate about an axis extending perpendicularly to and laterally displaced from the line of cutting and holding said tool, drive means including latch means drivingly connected between said ram and said rotary tool holder for oscillating said tool holder about its axis in dependency on the direction of the reciprocating movement of said ram, stop means arranged on said ram for engagement with the tool holder for limiting the extent of oscillation in both directions, and friction coupling means arranged in the drive of said latch means and thereby in the oscillation drive of the tool holder, to provide for yielding in said oscillation drive when the tool holder engages said stop in either extremity of oscillation.

2. In a gear planing machine, a reciprocatory tool carrier ram, a tool adapted to cut in both directions of movement of the ram, a tool holder mounted in said ram to rotate about an axis extending perpendicularly to and laterally displaced from the line of cutting and holding said tool, drive means including latch means drivingly connected between said ram and said rotary tool holder for oscillating said tool holder about its axis in dependency on the direction of reciprocating movement of said ram, friction coupling means arranged in the drive of said latching means and thereby in the oscillation drive of the tool holder, to provide for yielding in said oscillation drive when the tool holder engages said stop in either extremity of oscillation, and an adjustable stop means for limiting the movement of said latch means for interrupting the movement thereof when said tool is in median position for detaching cuttings from said work by said tool in one direction of movement of said ram only, and for releasing said latch means for said tool to cut in both directions of ram movement, said friction coupling also serving to provide yielding in the oscillation drive when the adjustable stop means is adjusted to limit movement of the latch means.

3. In a gear planing machine, a reciprocatory tool carrier ram, a tool adapted to cut in either direction of movement of the ram, a tool holder mounted in said ram to rotate about an axis extending perpendicularly to and laterally displaced from the line of cutting and holding said tool, drive means including latch means, nose and socket drive means interposed between said latching means and said rotary tool holder, friction coupling means in said drive for allowing yielding in said drive when said tool holder engages the stop means in either direction of oscillation, levers interposed between said friction coupling means and said latch means for actuating said latch means to pivotally displace said tool holder as limited by engagement of said holder with said stop means at each stroke of said ram, and an adjustable stop means for limiting the movement of said latch means by interrupting said movement when said tool is in median position for detaching cuttings from the work by said tool in one direction of movement of said ram only, and for releasing said latching means for said tool to cut in both directions of ram movement.

EMIL LAESSER.

REFERENCES CITED

The following references are of record in the file of this patent:

UNITED STATES PATENTS

| Number | Name | Date |
| --- | --- | --- |
| 298,268 | Angus | May 6, 1884 |
| 934,078 | Kuwada | Sept. 14, 1909 |
| 1,041,984 | Eggers | Oct. 22, 1912 |
| 1,290,270 | Maag | Jan. 7, 1919 |

FOREIGN PATENTS

| Number | Country | Date |
| --- | --- | --- |
| 658,285 | France | Jan. 25, 1929 |